United States Patent [19]

Bolick, Jr. et al.

[11] 4,138,695

[45] Feb. 6, 1979

[54] CASSETTE CENTRAL DICTATION SYSTEM

[75] Inventors: Fred C. Bolick, Jr.; Theodore Titus, IV; Said Mohammadioun, all of Atlanta, Ga.

[73] Assignee: Lanier Business Products, Inc., Atlanta, Ga.

[21] Appl. No.: 753,360

[22] Filed: Dec. 22, 1976

Related U.S. Application Data

[60] Division of Ser. No. 554,476, Mar. 3, 1975, which is a continuation of Ser. No. 327,501, Jan. 29, 1973, abandoned.

[51] Int. Cl.² ............................................. G11B 15/68
[52] U.S. Cl. ................................................... 360/92
[58] Field of Search ................... 360/92; 179/100.3 S, 179/100.4 PT

[56] References Cited

U.S. PATENT DOCUMENTS

| | | | |
|---|---|---|---|
| 3,584,879 | 6/1971 | Ban | 360/92 |
| 3,765,684 | 10/1973 | Sato | 360/92 |
| 3,820,101 | 6/1974 | Bolick, Jr. | 340/259 |
| 3,996,617 | 12/1976 | Cousino | 360/92 |
| 4,021,855 | 5/1977 | Czonka et al. | 360/92 |

Primary Examiner—John H. Wolff
Attorney, Agent, or Firm—Jones, Thomas & Askew

[57] ABSTRACT

A central dictation system for recording dictation or other messages. The messages are recorded on interchangeable record members such as conventional recording tape cassettes, and the present system is operable to substitute a new cassette for a cassette containing one or more recorded messages, either upon receipt of a signal indicating termination of message recording or upon the occurrence of certain other events. A signal is provided when only a predetermined amount of recording time remains on a cassette, notifying the user that substitution of a new cassette will occur after a predetermined amount of time elapses. Another signal is provided during the cassette substitution cycle to prevent message dictation until the new cassette is positioned to receive dictation. The cassette central dictation system of the present invention is usable in combination with one or more dictate stations and in conjunction with a system including another central message recording apparatus, and circuitry is provided to enable priority selection of the cassette central dictation system.

1 Claim, 9 Drawing Figures

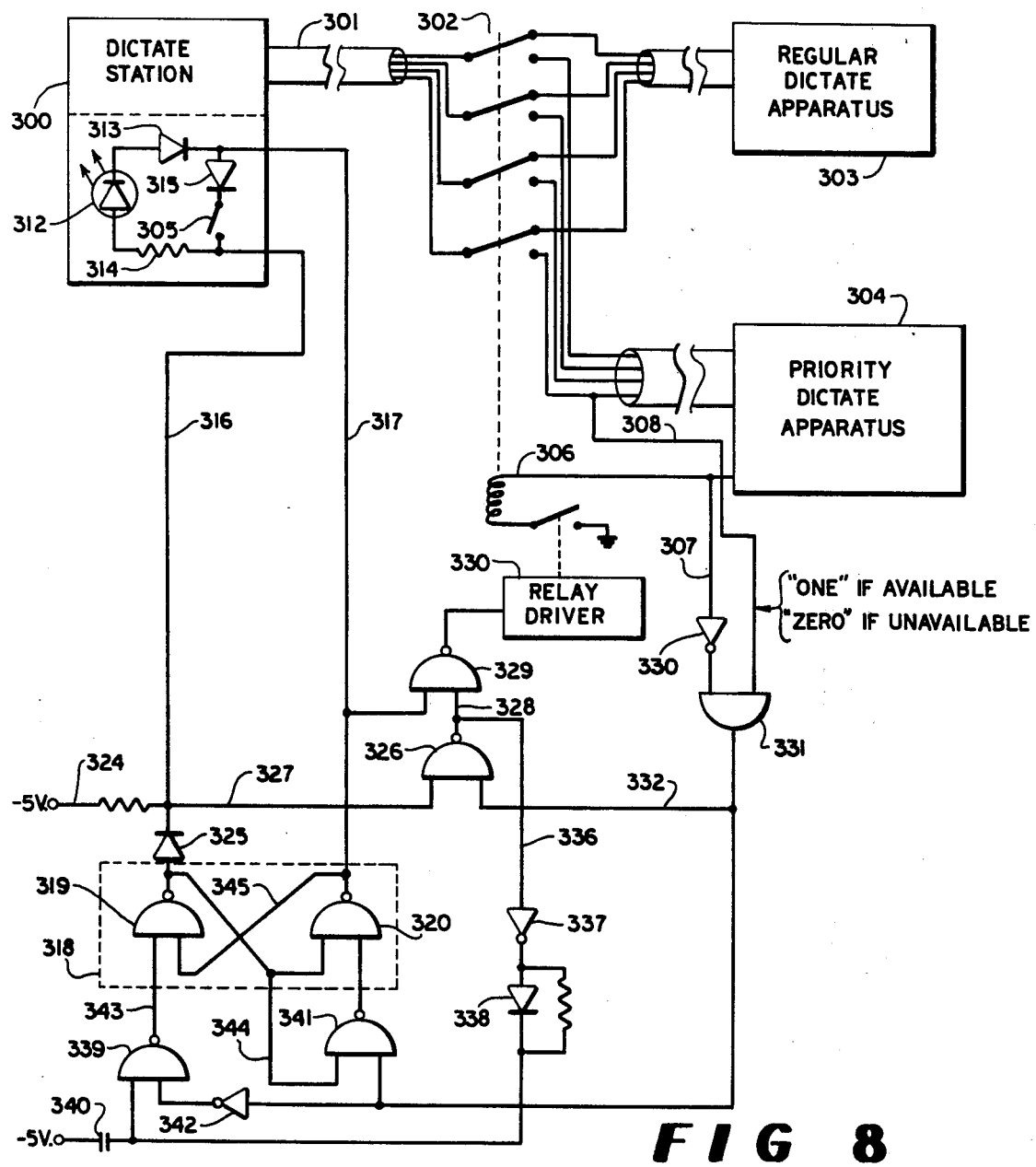
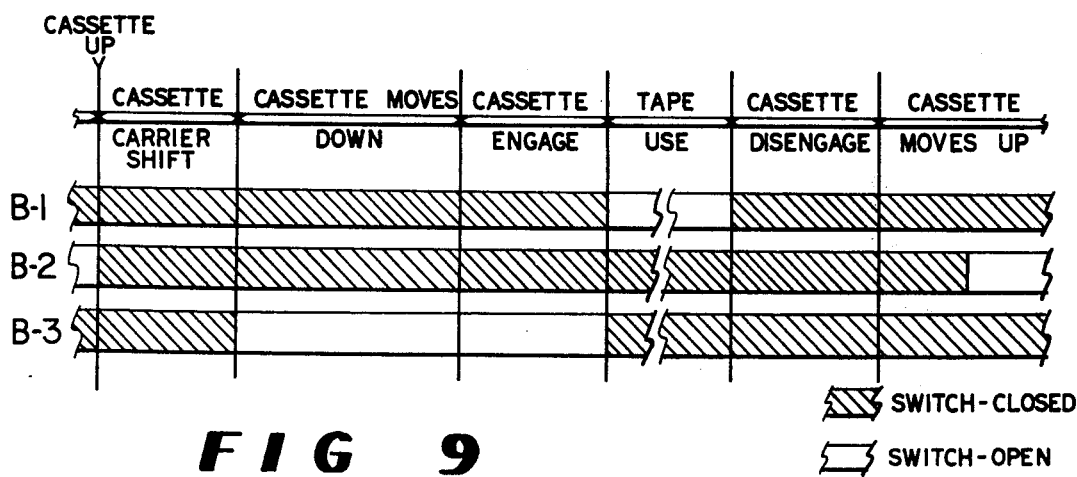
FIG 8
FIG 9

CASSETTE CENTRAL DICTATION SYSTEM

This is a division, of application Ser. No. 554,476, filed Mar. 3, 1975 which is a continuation of application Ser. No. 327,501, filed Jan. 29, 1973, now abandoned.

This invention relates in general to message recording systems and in particular to a control dictation system for recording dictated messages.

Various types of voice recording systems and devices are known which are particularly adapted for recording dictated messages, so that a person using such message dictation apparatus may dictate correspondence or other spoken messages to a machine as an alternative to dictating the messages to a secretary or stenographer. The advantages of using dictation message recording apparatus, rather than requiring a person to take down the message by shorthand or like techniques, has become well-known, since the dictation machine is always available to receive dictation while the secretary or stenographer remains available to accomplish other tasks.

Dictation recording apparatus of the prior art generally falls within two classes which can be identified as (1) desk-top apparatus, and (2) central dictation system apparatus. With regard to the desk-top dictation apparatus, the dictator is provided with a separate desk-top dictation recording apparatus which records his dictated messages on to a suitable recording medium such as magnetic tape, belts, discs, or the like. When the person has finished dictating one or more messages, the recording medium is physically removed from his dictation apparatus and is then carried to a separate transcribing apparatus, typically located adjacent a secretary's work station, where the recording medium is inserted into the transcribing apparatus for playing back the recorded messages.

In the typical central dictation system, by contrast, the dictator is provided only with a dictate station, typically comprising a microphone and/or speaker, and several control switches, all of which are suitably connected to a message record playback apparatus which may be disposed remotely of the dictate station and which may be made available for receiving dictation from several separate dictate stations. The more advanced central dictation systems of the prior art typically employ an endless loop of recording tape, and thus offer the advantage that insertion, removal, or other handling of the recording medium is eliminated.

While central dictation systems of the type utilizing an endless length of recording tape eliminate handling of the recording medium, it can be seen that messages dictated on such a central dictation system can only be transcribed serially in the order of dictation, that is, first-on, first-off. While this limitation may be of little significance in many applications, some users of dictation equipment prefer a system where a particular dictated message can be assigned "priority" status for transcription out of its turn in a sequence of dictated messages. As a practical matter, this preference implies a dictation system wherein the recording medium can be removed or otherwise selectively accessed for subsequent message playback and transcription.

While central dictation systems have been proposed using separate recording media such as magnetic belts or the like, such prior art dictation apparatus has typically required the presence of an operator or attendant to remove a particular recording medium from a central dictation machine, either immediately after priority dictation has been concluded or as soon as the capacity of a particular recording medium is exhausted. If this attendant did not immediately remove the recording medium containing the dictated message(s), then the remotely-located dictator would fail to receive priority handling of his message, or would be unable to dictate any additional messages in the case of the recording medium being full. Prior-art attempts to overcome this problem have generally required the use of plural central dictation machines combined with some switching apparatus for transferring the dictate station to a second dictation machine when the recording medium associated with a first machine became full, an expensive expedient at best.

Furthermore, the introduction and increasing popularity of the standardized recording tape cassette popularly known as the "C" cassette (e.g., C-60), has led a number of dictation equipment manufacturers to provide portable and other types of dictation equipment utilizing the standard cassettes in lieu of another type or types of special-purpose recording media. Thus, the use of a central dictation system employing either an endless tape or separate, removable recording media other than standard cassettes makes such central equipment noncompatible with the remainder of the dictation equipment which a particular user may employ.

Accordingly, it is an object of the present invention to provide an improved central dictation system and apparatus.

It is another object of the present invention to provide an improved central dictation system including priority message dictation capability.

It is still another object of the present invention to provide a central dictation system utilizing standard tape cassettes as the recording medium.

Many of the other objects and attendant advantages of the present invention will become more readily apparent from the following description of the disclosed embodiment thereof, including the annexed drawing in which:

FIG. 8 shows a functional schematic diagram of a priority dictation transfer system according to a disclosed embodiment of the present invention; and FIG. 9 is a timing diagram illustrating the sequence of events and switch actuation which occur during a cassette substitution cycle of the disclosed embodiment of the present invention.

Stated in general terms, the present invention includes message dictation recording apparatus which receives a plurality of record members such as standard tape cassettes, which operates to dispose one of the record members at a time into operative relation with a tape transport mechanism and a message transducer, and which selectively operates upon the occurrence of one or more predetermined events to remove the cassette from the tape transport mechanism and to substitute another cassette from the available plurality of cassettes. Cassette substitution may be controlled by events such as a signal denoting the termination of dictation equipment seizure, by a signal responsive to the amount of tape remaining on the cassette, by the absence of selected cassette tape motion, or by other conditions. A dictator is provided with suitable signals indicating when only a predetermined amount of tape remains on the cassette for dictation, and for signalling the occurrence of a cassette substitution cycle. The present invention also includes priority switching circuitry for enabling a dictate station to be selectively interconnected for message dictation with either a regular central dictation apparatus or with a priority central dictation apparatus.

Figure 5:
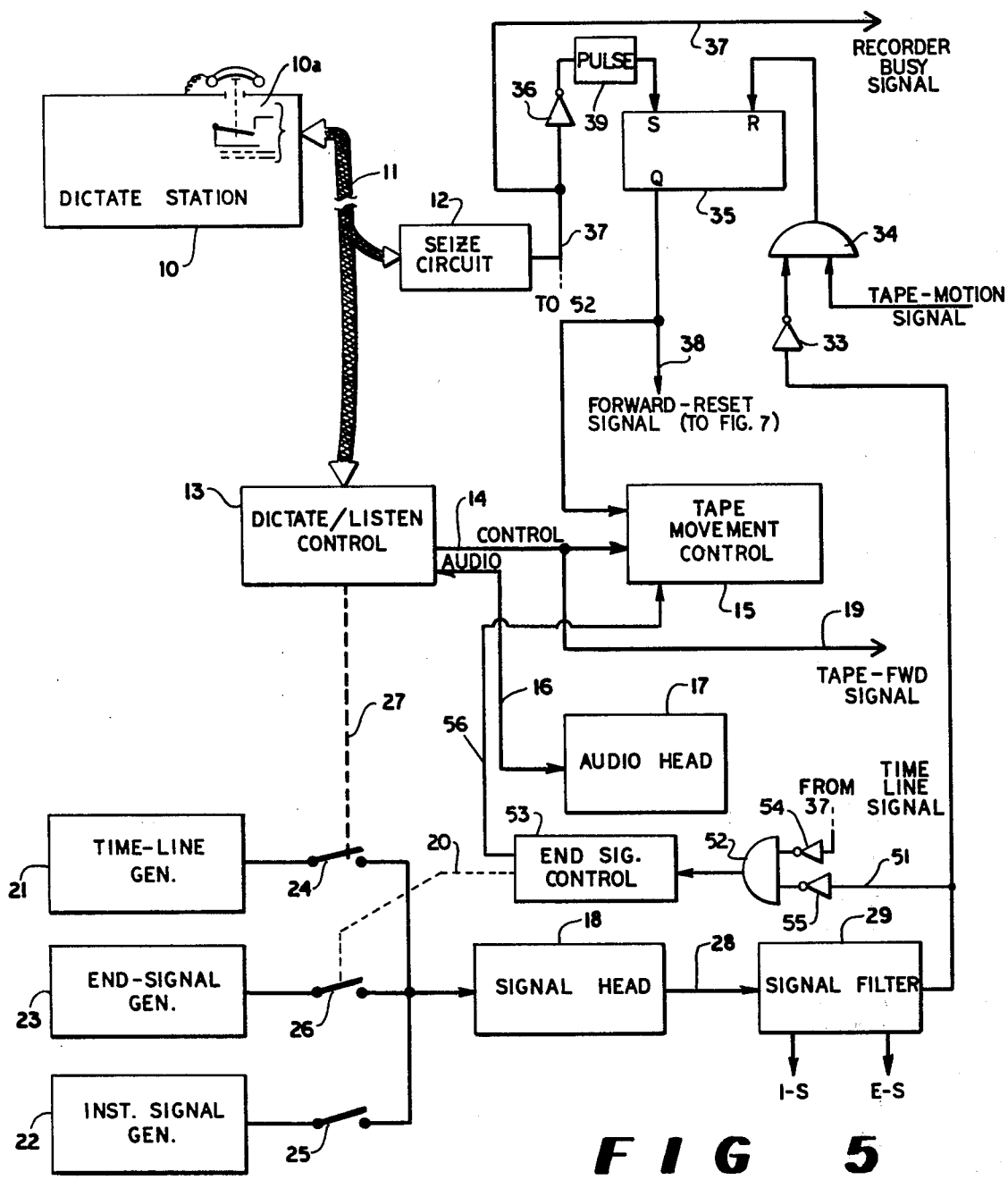
FIG. 5 shows a schematic diagram of the dictation and message control circuits according to the disclosed embodiment.

Turning next to the Figures for consideration of the herein-disclosed embodiment of the present invention, with particular reference to FIG. 5, there is shown in functional block diagram form the message and control signal recording portion of a central dictation system according to the present invention and including a multiple-conductor line 11 extending between a remotely-positioned dictate station 10 and the seize sensing circuit 12 and dictate/listen control 13. It will be understood by those in the art that dictate stations of the type conventionally used in central dictation systems typically include a hook switch 10a, shown in the on-hook position in FIG. 5, for signalling desired interconnection between the dictate station and the central dictation recorder, various operational controls for providing control signals corresponding to dictation functions such as forward-dictate, reverse, and forward-listen, as well as a microphone and speaker for two-way audio communication between the dictate station and the central recorder. The specific details of such dictate stations are known to the prior art and are not repeated herein.

Those skilled in the art are also aware that operation of the dictate station hook switch to an off-hook condition typically closes a circuit, and this circuit closure is sensed by the seize circuit 12 to cause a predetermined signal condition, known hereinafter as a "busy signal," to appear within the central dictation apparatus. This busy signal is conventionally applied on the line 37 to other portions of the central dictation apparatus, and also back along the line 11 to signal the particular dictate station 10 that seizure of the central dictation apparatus has been accomplished and to establish and maintain a lock-out condition in all other dictate stations which may be connected in parallel to the particular central dictation apparatus.

The central recorder is provided with a dictate/listen control 13, which receives the signals produced by the dictate station operational controls and applies the proper operational control signals along a line 14 to the tape movement control 15. The tape movement control 15 typically includes solenoids and/or other devices which control the relative movement of the recording tape (or other recording medium) with respect to the transducer or transducers. The dictate/listen control 13 also is connected by the line 16 to the audio transducer head 17, which will be understood to be a conventional record-playback transducer in contact with the recording tape. When dictation is being spoken into the microphone at the dictate station, the audio signal supplied along the line 11 is routed through suitable amplifiers and along the line 16 to cause a suitable audio record signal to be applied to the audio head 17. Correspondingly, when a control signal from the dictate station commands playback of the tape in a listen mode, audio signals which are received by the audio head 17 are applied along the lines 16, amplified, and fed along 11 to be transmitted back to the dictate station.

In the disclosed embodiment of the present invention, a second transducer head 18 known as a "signal head" is also in transducing contact with a separate track of the recording tape as will become apparent below from the discussion of FIG. 6. The signal head 18 is selectively connectable to receive control signals from the time-line generator 21, the instruction-signal generator 22, or the end-signal generator 23, depending on which of the corresponding switches 24, 25, or 26 is closed. Each of the three signal generators 21, 22, and 23 produces an audio tone signal at a frequency which is distinct from the frequencies produced by the other two generators, and these signals are imposed upon the recording tape by the signal head 18. The switch 24 has control interconnection as at 27 with the dictate/listen control 13, and this control interconnection functions to close the switch 24 at all times whenever a message is being dictated onto the tape from the dictate station. The switch 26 has a corresponding control interconnection 20 with the end signal control 53 to momentarily close the switch 26 at the termination of a dictated message, denoted by an interruption of the time line, as described below. Additional details of apparatus for imposing time-line and other control signals upon one or more control signal tracks of a recording medium are found in the copending U.S. application Ser. No. 149,480, filed June 3, 1971.

During forward-listen operation of the central dictation system, any control signals which were previously recorded onto the tape through the signal head 18 are transduced by that head as signals on the line 28, and a suitable signal filter section 29 is provided to separate the three frequencies of signals applied by the respective generators 21–23. The filter section 29 may be provided by three band-pass filters tuned to the three separate frequencies to be separated. The time-line signal from the filter section 29 is applied to an INVERT circuit 33, and thence to an AND gate 34. The other input to the AND gate 34 is a tape-motion signal which is present only when actual movement of the recording tape (or other recording medium) occurs.

The output signal from the AND gate 34 is applied to the reset input of a flip-flop 35, and the set gate of this flip-flop is connected through the INVERT circuit 36 and the pulse circuit 39 to receive a signal which is the inversion of the recoder-busy signal, previously discussed above, applied along the line 37. When the busy signal is removed from the line, the resulting "one" output of the INVERT circuit 36 is applied to the pulse circuit 39 to apply a momentary "one" to place the flip-flop 35 in the "set" state. The Q output of the flip-flop 35, which is present when the flip-flop is in the "set" state, is applied to the tape movement control 15 to cause the tape to move in the forward-listen mode; this Q signal is also applied as a forward-reset signal to the apparatus shown in FIG. 7 and described below. It is thus seen that the tape movement control 15 is operative to cause the tape to move in the forward-listen mode in response to either a forward-listen command signal from the dictate station 10 or a forward-reset signal provided by the Q output of the flip-flop 35. Forward-listen tape movement in response to the forward-reset signal continues until a break in the time line signal, corresponding to the end of a previously-recorded message, causes a "zero" time-line signal to be inverted at 33 and applied to the AND gate 34. A "one" signal is already present at the tape-motion input of the AND gate 34, and so the "reset" input of the flip-flop 35 receives a "one" signal causing the Q output, or forward-reset signal, of that flip-flop to become "zero" and the forward-listen tape movement to stop.

The end signal control 53 functions in response to a "one" input signal from the AND gate 52 to cause momentary closure of the end signal switch 26 along the control interconnection 20. The end signal control functions concurrently to provide a momentary control signal along the line 56 to the tape movement control 15 to cause the tape to move forward for the duration of the momentary signal, so that an end signal from the end-signal generator 23 can be recorded on the tape. The presence of a busy signal as inverted at 54 prevents the end signal control 53 from receiving a "one" signal while the central dictation system is seized. Moreover, the presence of a "one" time-line signal during forward-reset operation after the busy signal becomes "zero", is inverted at 55 to prevent operation of the end signal control 53. As soon as a "zero" signal is present on both the line 51 and the line 37, however, the end signal control 53 receives a "one" from the AND 52 to operate as mentioned above.

Figure 6:
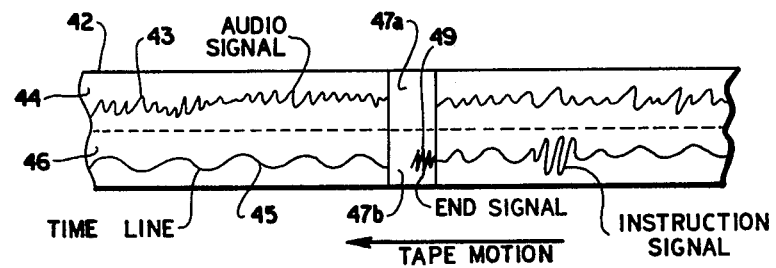
FIG. 6 shows a representation of a section of recording tape containing message information and control signal information as imparted according to the disclosed embodiment of the present invention.

Turning to FIG. 6, the diagrammatic representation of a segment of recording tape 42 therein depicted is shown to contain an audio signal 43 recorded on a first track 44 of the tape, and a time-line signal 45 recorded on a second track 46 thereof. It can be seen that the time line 45 is coextensive in duration with the duration of the audio signal 43; for any interruption in the recorded audio signal, as at 47a, for example, there is a corresponding interruption 47b in the time-line signal. The second track 46 also may receive one or more instruction signals and an end-of-message signal 49, as selectively applied by the respective signal generators 22 and 23 through the signal head 18. It will be understood by those skilled in the art that the switch 25 for the instructional signal may be manually or otherwise selectively operated to impart the instruction signals to the second track 46 of the tape. The short gap depicted between the interruption of the time line and the ocurrence of the end signal is a result of tape speed momentum and time lag inherent in the operating circuitry of an actual working embodiment.

Cassette Substitution Apparatus

A description is provided herein of exemplary cassette changing apparatus which functions to serially place each of a plurality of cassettes into record-playback engagement with the transducing heads 17 and 18. Although a particular design of cassette changer mechanism is employed with the herein-disclosed embodiment of the present invention, those skilled in the art will be aware that the actual cassette changing mechanism per se, apart from the interrelation of such mechanism as an element of the cassette central dictation system of the present invention, is but one of a number of alternative mechanisms which can be employed for automatic substitution of a record medium such as a cassette. One example of a tape cassette changer mechanism is shown in U.S. Pat. No. 3,690,587.

Figure 1:
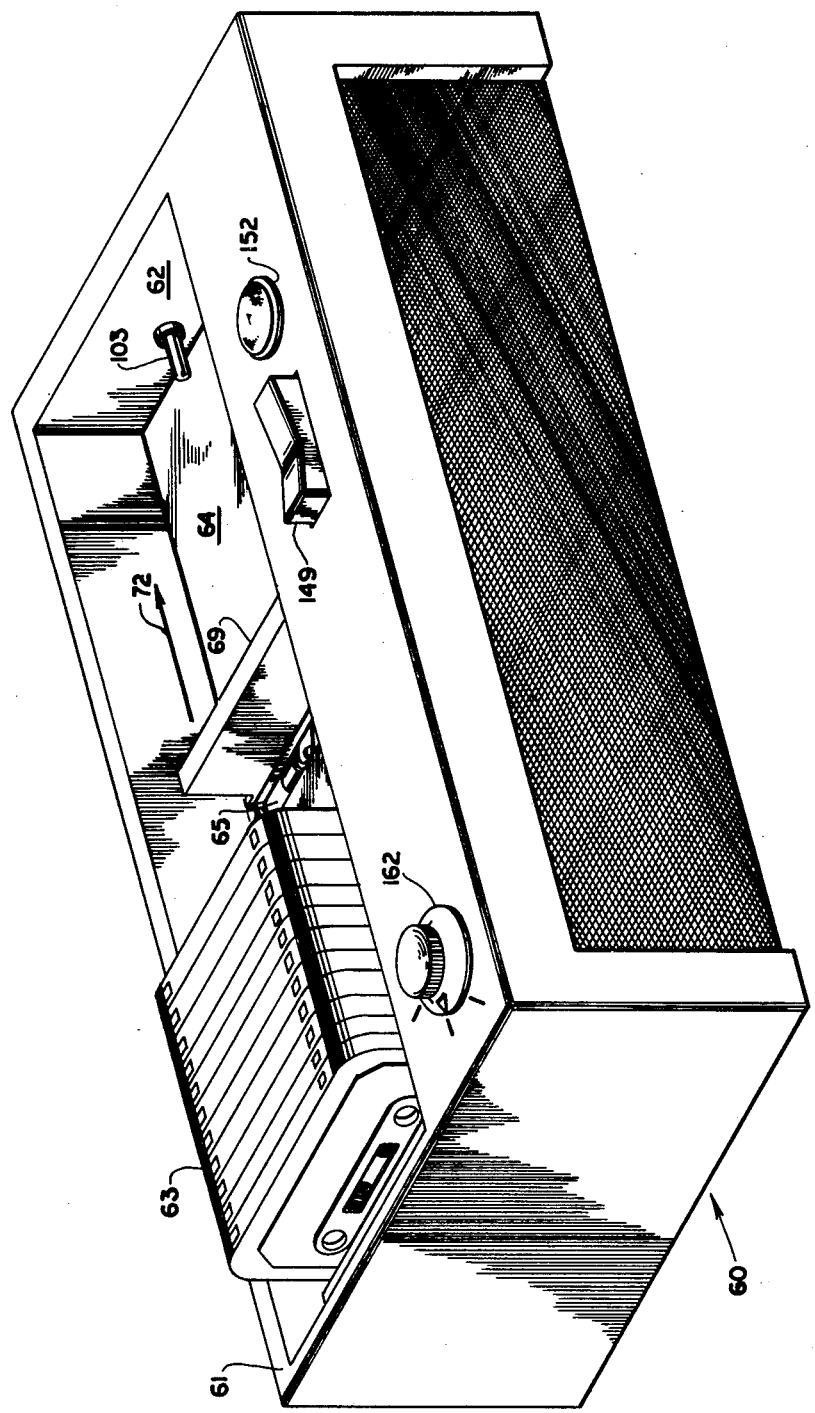
FIG. 1 shows an isometric view of tape cassette changing apparatus used in a disclosed embodiment of the present invention.
Figure 2:
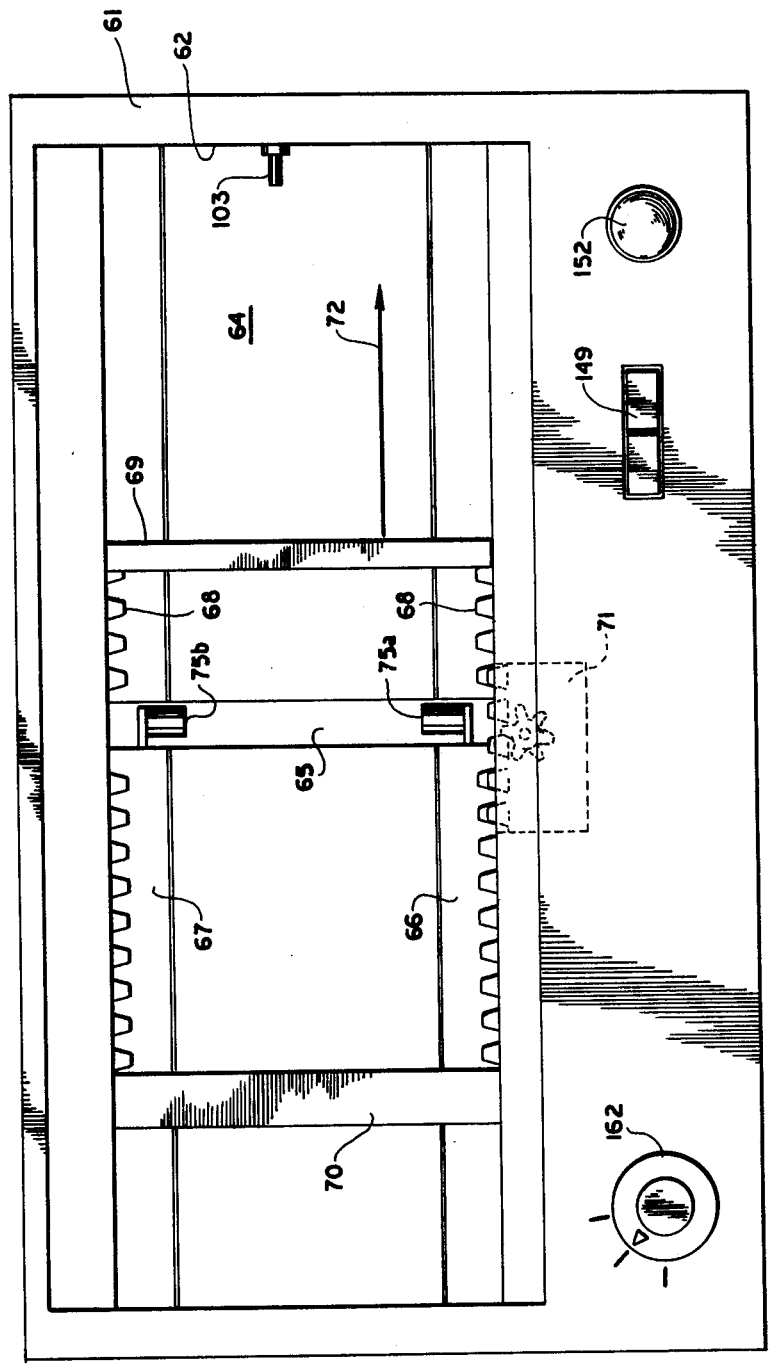
FIG. 2 shows a top plan view of the apparatus shown in FIG. 1.

Turning to FIGS. 1 and 2, there is shown generally at 60 a cassette changing apparatus having a housing 61 formed to define an elongated cassette receptacle 62 having a width somewhat greater than the width of the particular cassettes 63 to be used. In the illustrated example, the cassettes 63 are of the aforementioned standard cassettes which bear designations such as C-60, C-90, or the like, depending upon the amount of tape contained in the cassette. The receptacle 62 is defined by a floor 64 having a slot 65 dimensioned to permit any of the cassettes 63 to pass therethrough. A pair of opposed side members 66 and 67, each of which has a plurality of vertically-disposed ribs 68, are jointed together by the end members 69 and 70 to define a cassette carrier which is slideably movable along the length of the cassette receptacle 62. A suitable indexing mechanism is provided for selectively moving the cassette carrier along the receptacle 62 from one end to the other end thereof, with each indexing operation moving the cassette carrier a predetermined distance in the direction shown by the arrow 72. It will be appreciated that each indexing operation of the cassette carrier moves the carrier by an amount equal to the width of a cassette disposed between the ribs 68, so that each of the cassettes 63 disposed in the carrier is serially positioned above the slot 65 in the receptacle floor 64 by serial indexing operations.

The indexing movement of the cassette carrier may be controlled by suitable mechanism such as the rack and pinion arrangement 71, whereby the pinion may be connected to a suitable escapement-type mechanism operated by a solenoid or the like, which is actuable to cause the cassette carrier to be indexed to place the next cassette position in line with the slot 65.

Figure 3:
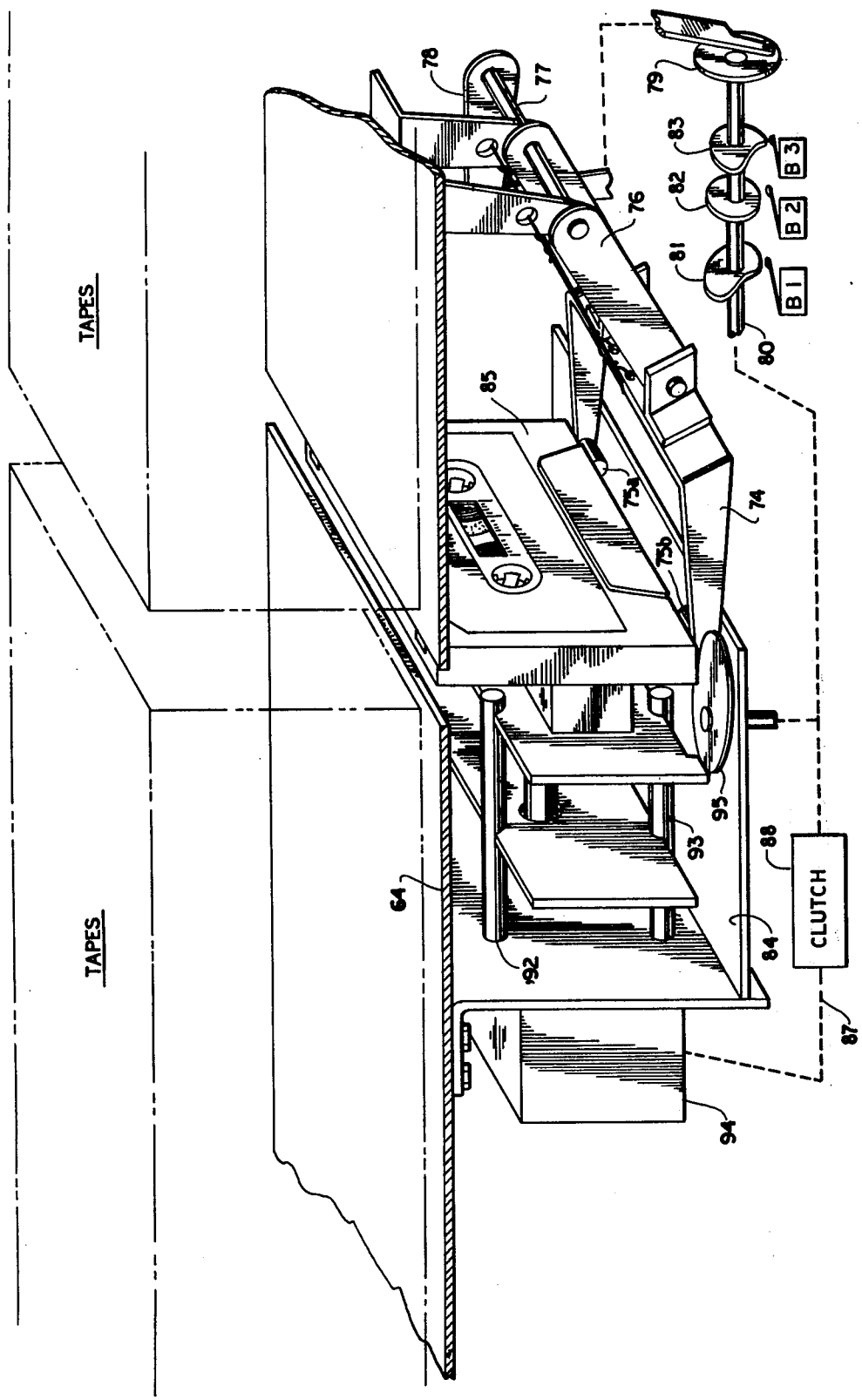
FIG. 3 shows a pictorial view of the cassette changing mechanism depicted in FIG. 1, including a cassette positioned to be engaged by the tape transport mechanism for message recording.
Figure 4:
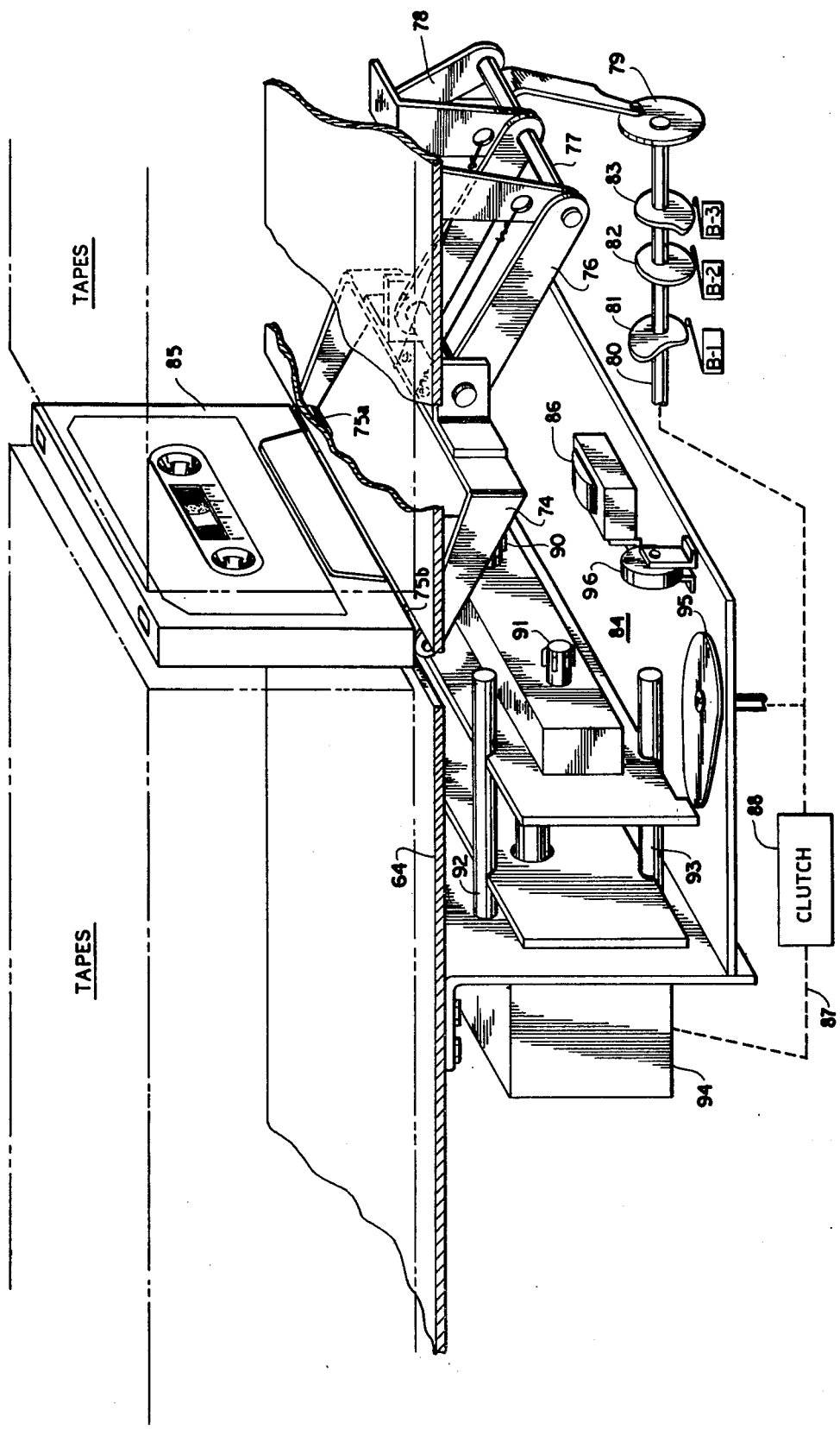
FIG. 4 shows the cassette changing apparatus as in FIG. 3, with a cassette ejected from the mechanism.

Turning now to a view of the exemplary cassette changing mechanism as shown in FIGS. 3 and 4, a cassette transporting member 74 having a pair of cassette support ends 75a and 75b is pivotally connected by means of the parallelogram linkage 76 to be moved by rotation of the shaft 77. The shaft 77 is selectively rotated by a crank linkage 78 connected to a disk 79 mounted for rotation by a shaft 80 selectively connected through the clutch mechanism 88 and the shaft 87 to the actuating device 94. The electrical switches B-1, B-2, and B-3 are disposed to be selectively actuated by corresponding cams 81, 82, and 83 mounted for rotation by the shaft 80. The true profiles of the cams 81, 82, and 83 are omitted from FIGS. 3 and 4, inasmuch as the timed operation of the switches B-1, B-2, and B-3 is detailed below. As an alternative to the cam-operated switches B-1, B-2, and B-3, the functions of these switches can be provided by segmented commutators rotated by the shaft 80.

It will be understood that rotation of the shaft 80 causes the parallelogram linkage 76 to alternate between the position shown in FIG. 4, wherein the cassette support ends 75a and 75b are substantially flush with the floor 64 of the cassette receptacle, and the position shown in FIG. 3, wherein the support ends are lowered approximately to the level of the support member 84. A particular cassette 85 which is positioned by the cassette carrier to be disposed over the slot 65, is normally supported by the support ends 75a and 75b to maintain the position shown in FIG. 4. When the mechanism 94 and the clutch 88 are energized, however, the descending support ends 75a and 75b permit the cassette 85 to be lowered below the floor 64 to reach the position shown in FIG. 3. When the cassette 85 is disposed in a lowered position as shown in FIG. 3, the transducer head assembly 86 is placed into transducing engagement with the tape contained within the cassette. It will be understood that the head assembly 86 may include the audio head 17 and signal head 18 previously mentioned, as well as suitable erase heads.

A tape transport mechanism is provided including a pair of spindles 90 and 91, spaced apart to match the reel-to-reel spacing of the cassettes in use. The tape transport mechanism is supported for lateral movement by an appropriate mechanism including a pair of rails 92 and 93, and an actuating device schematically shown by the cam 95 connected for rotation by the shaft 80 is provided for selectively moving the tape transport mechanism along the aforementioned rails to assume either a retracted position, as shown in FIG. 4, or an engaged position as shown in FIG. 3 wherein the transport mechanism spindles 90 and 91 operatively engage the corresponding tape reels of the lowered cassette 85. Those skilled in the art will appreciate that the laterally-movable tape transport mechanism includes other conventional elements, such as a capstan and alignment pins for engaging the cassette 85, which are omitted from the drawings for clarity inasmuch as such elements are conventional in the art of tape transport mechanisms for use with cassettes. Moreover, a pinch roller 96 of conventional construction and operation is positioned in opposed relation to the capstan as positioned within the cassette 85.

In a complete cassette changing cycle of the disclosed exemplary cassette changing mechanism, starting at the position shown in FIG. 3 wherein a cassette is lowered and the tape transport mechanism is fully engaged with the cassette, the actuating device 94 is operated and the clutch 88 is engaged to withdraw the transport mechanism from engagement with the cassette 85. The cassette is then elevated by the support ends 75a and 75b to assume the position shown in FIG. 4. The actuating device 94 may be provided by a selective interconnection with the motor which normally drives the spindles 90 and 91, or may alternatively be provided by a separate motor. When the cassette 85 is fully elevated, the cassette carrier is indexed one position by suitable interconnection between the indexing mechanism and the cassette changing mechanism to place the next cassette over the slot 65. Continuing rotation of the shaft 80 lowers the support ends 75a and 75b to the point whereat the new cassette is positioned in alignment with the tape transport mechanism. Finally, rotation of the cam 95 moves the tape transport mechanism into engagement with the newly-loaded cassette.

The several stages of the cassette changer operation, wherein a new cassette is substituted for a cassette previously disposed in record-playback relation with the head assembly 86, are depicted graphically in FIG. 9 along with the corresponding positions of the switches B-1, B-2, and B-3 in the operation of the disclosed embodiment. In particular, it can be seen that the cam-operated switch B-1 is opened when the tape transport mechanism is actually engaged with a cassette 85 and is closed at all other times. The switch B-2 is momentarily opened during the cassette-eject portion of each cassette substitution cycle. For example, the switch B-2 may open when the cassette being ejected is approximately one-half way toward the fully-elevated position as shown in FIG. 4, and may close by the time the cassette becomes fully elevated. The cam-operated switch B-3 is opened, in the disclosed embodiment, after the cassette carrier has shifted to position a new cassette over the slot 65, and before substantial downward movement of the new cassette commences. The switch B-3 is closed when the cassette substitution cycle is completed. The functional purpose of these three switches will become apparent from the following description of the control circuitry provided with the disclosed embodiment of the present invention.

Control Circuitry

Figure 7:
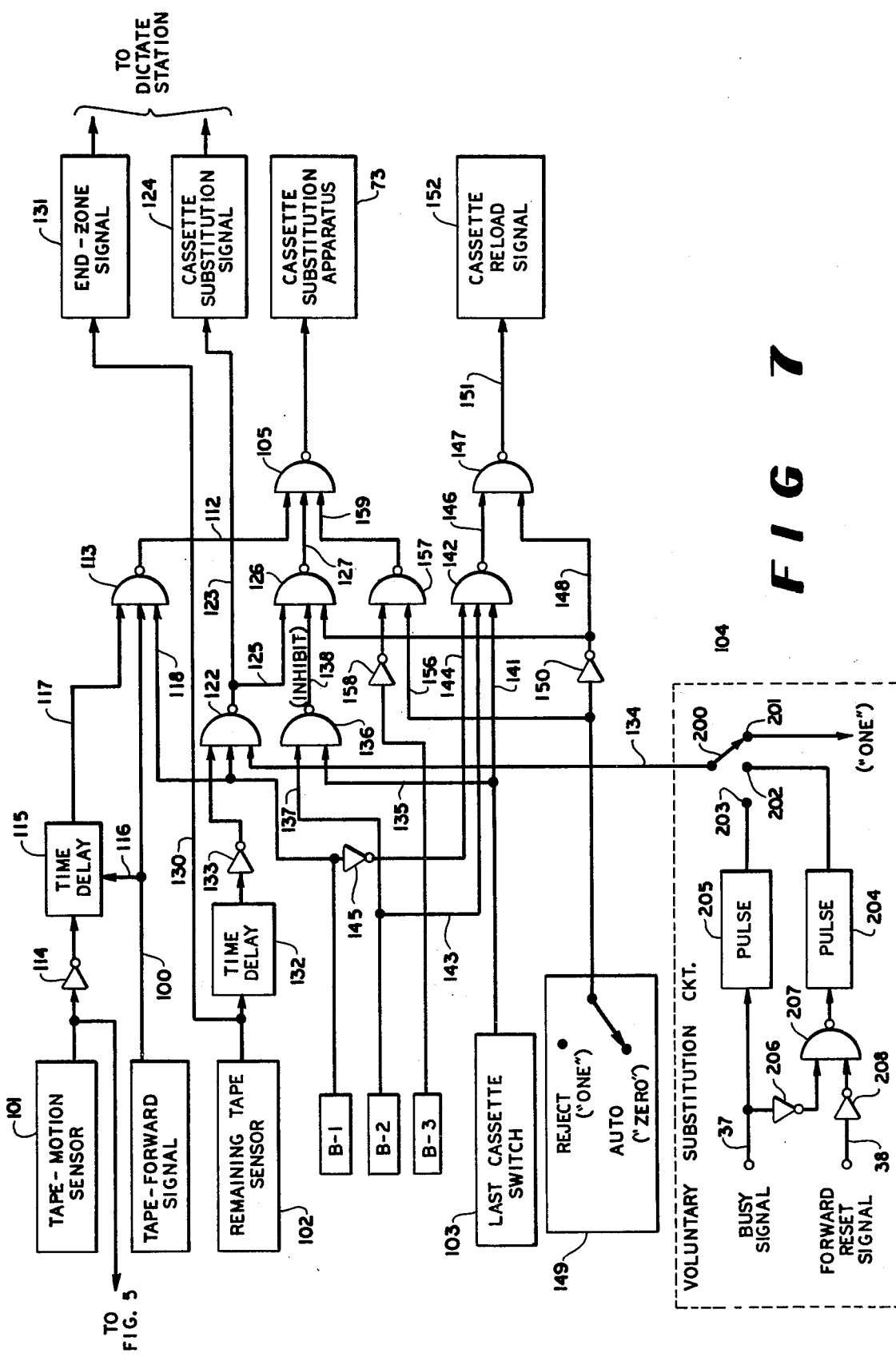
FIG. 7 shows a functional schematic diagram of the cassette changing apparatus control circuitry according to the disclosed embodiment.

The control circuitry as shown in FIG. 7 receives a number of input signals which function, either through the presence or the absence of such signals, to control the various operations of the cassette substitution apparatus. A tape-forward signal is supplied to the line 100 from the dictate-listen control of FIG. 5, so that a logic "one" tape-forward signal is present whenever the tape movement control 15 receives a signal commanding the tape transport mechanism to advance the tape in either the forward-listen or the forward-dictate modes.

A tape motion sensor 101 provides an output signal whenever the tape of a cassette 85 engaged by the tape transport mechanism 90 is actually in motion. The tape motion sensor 101 may be provided by any appropriate device or mechanism, with an example of such sensor being provided by a commutator connected to be rotatably driven by movement of the conventional tape pinch roller so that tape-driven rotation of the pinch roller produces a series of signal pulses at a brush in contact with the commutator. An appropriate circuit such as an R-C integrator can be connected to smooth the pulses from the commutator, thus providing a suitably constant tape motion signal at all times that the tape is actually in motion. Failure of commanded tape motion, as caused by a jammed cassette or by an exhausted tape supply, for example, terminates the output signal from the tape motion sensor 101.

A remaining-tape sensor 102 is operative to provide a logic "one" output signal when only a predetermined amount of tape remains on the supply spool of the cassette being driven by the tape transport mechanism. The remaining-tape sensor 102 may be provided by apparatus as shown in the copending U.S. Pat. application entitled "Remaining Tape Sensing Apparatus", filed on June 15, 1972 and having Ser. No. 263,314, now issued as U.S. Pat. No. 3,820,101 or by any other suitable apparatus. As an alternative to a sensor which indicates when a predetermined amount of tape remains, a counter or other mechanism of the type known to the art may be employed to signal when a predetermined amount of tape has been wound on the take-up spool.

The last-cassette switch 103 is operative to provide a logic "one" output signal when the cassette carrier has indexed to the position whereat the last cassette is available to be loaded into operative relation with the tape transport mechanism. The last-cassette sensor may be simply provided by a normally-open momentary push switch 103 located as shown in FIG. 1, to be engaged when the cassette carrier indexes into position to place the last one of the available cassettes over the slot 65.

The voluntary-substitution circuitry contained within the broken lines 104 receives a recorder-busy signal from line 37 of FIG. 5, and also receives the forward-reset signal present on line 38 of that Figure.

There are two basic types of events which control cassette substitution according to the present invention. The first type of event, referred to herein as "voluntary substitution" denotes a cassette substitution which occurs at the control of the dictator, or as the result of some act performed by him. The second kind of event, known as "involuntary substitution" denotes a cassette substitution which occurs in response to certain other events or conditions not specifically commanded or controlled by the dictator. The various operational events which produce involuntary substitution are considered first herein, and it is assumed for illustrative purposes that a particular cassette 85 is operatively engaged by the tape transport mechanism 90 so that the switch B-1 is open and switches B-2 and B-3 are closed. The clutch 88, actuating device 94, or other control responsive elements of the cassette substitution apparatus, are shown diagrammatically at 73 on FIG. 7 and are considered as being operative to initiate a cassette substitution signal as described above when a logic "one" signal is received from the NAND gate 105. Each of the switches B-1, B-2, and B-3 in the disclosed embodiment provides a logic "one" when open-circuit and a logic "zero" when closed-circuit.

Those skilled in the art will recognize a NAND gate, such as the gate 105, as a logic device which provides a "zero" output if and only if all of the inputs to the device are "one". Thus, the NAND gate 105 provides a "one" output to the cassette substitution apparatus 73 whenever a "zero" condition is present on any of the three inputs to that gate. One of the inputs to the NAND gate 105 is provided along the line 112 from another NAND gate 113, which functions to produce a "zero" signal to the NAND gate 105 in the event that the several possible conditions for an involuntary cassette substitution are present. Involuntary cassette substitution occurs in response to such events as the failure of a commanded tape-forward signal, or an indication that only a predetermined amount of tape remains on the cassette supply spool. Considering the absence of commanded tape-forward movement, a "one" signal appears on the line 100 in response to a tape-forward command signal, which normally occurs when the dictator is commanding either forward-dictate or forward-listen movement of the tape. The normal occurrence of tape movement in response to this command signal causes the tape motion sensor 101 to provide a "one" output signal which is inverted at 114 to provide a "zero" input to the time delay circuit 115. This "zero" state is passed unaltered by the time delay 115 along the line 117 as an input to the NAND gate 113. It can be seen at this time that the NAND gate 113 receives a "zero" input from the line 117, a "one" tape-forward signal along the line 100, and a "one" input along the line 118 from the open switch B-1, and so the NAND gate 113 provides a one input to the NAND gate 105. (It is assumed at this time that the NAND gate 105 is also receiving "one" signals on its additional two inputs.)

If the commanded tape motion does not occur, however, then the absence of a signal from the tape motion sensor 101 is inverted by 114 to provide "one" input to the time delay circuit 115. This time delay, after a suitable delay of approximately one second, for example, to prevent false signalling, provides a "one" output along the line 117 to the NAND gate 113. Since all of the logic input conditions to the NAND gate 113 are now "one", a "zero" appears on the output of that gate and is applied along the line 112 to an input of the NAND gate 105, whereupon a "one" signal is supplied to initiate operation of the cassette substitution apparatus 73. In this manner, a cassette which is jammed or which has no further unrecorded tape cannot remain loaded in the cassette changer. The tape-forward signal is also supplied along the line 116 to the time delay circuit 115 so that this delay circuit is operative only in conjunction with the presence of a tape-forward signal. The absence of a tape-forward signal inhibits the operation of the time delay circuit to prevent the occurrence of a false ejection signal under certain operative conditions.

The switch B-1 is closed as soon as the cassette substitution cycle occurs, applying a logic zero to an input and the NAND gate 122 which had previously been receiving all "one" inputs to maintain a "zero" output. The occurrence of a "zero" from the switch B-1 causes the NAND gate 122 to provide a "one" output which accomplishes two purposes. Firstly, the "one" signal is applied along the line 123 to operate the cassette substitution signal 124, which supplies to the dictate station a distinctive audio tone or other signal advising the dictator that cassette substitution is occurring, so that he will not inadvertently dictate into "thin air" in the momentary absence of a cassette loaded to receive dictation. Secondly, the "one" signal from the NAND gate 122 is now applied along the line 125 to an input of the NAND gate 126. It will be presently seen that the other two inputs to the NAND gate 126 are also receiving "one" signals at this time, and so the NAND gate 126 provides a "zero" output along the line 127 to the NAND gate 105. This "zero" signal supplied along the line 127 maintains the "one" signal to the cassette substitution apparatus 73, even though the "zero" signal along the line 112 will disappear as soon as the tape-forward signal is no longer applied to the NAND gate 113.

Consider now another involuntary-substitution situation where the remaining-tape sensor 102 has detected that only a predetermined minimum amount of tape, for example, enough tape for only two more minutes of message dictation, remains on the loaded cassette. This "one" signal from the sensor 102 is directly applied along the line 130 to actuate the end-zone signal 131, which supplies to the dictate station a characteristic audio or other signal, preferably noticeably distinct from the cassette substitution signal provided by 124, advising the dictator that he is approaching the end of the tape. For example, the end zone signal produced by 131 is an intermittent beep of low volume while the cassette substitution signal produced by 124 is an intermittent tone of characteristically greater volume. The cassette substitution signal may be interconnected with the last-cassette switch 103 to produce a continuous tone when the last available cassette is ejected.

The "one" signal from the remaining-tape sensor 102 is simultaneously applied to the time delay circuit 132, which upon time-out provides a "one" signal which is inverted at 133 to provide a "zero" signal to an input of the NAND gate 122. The time delay circuit 132 preferably times out a sufficient time after commencement of the end-zone signal to provide a reasonable time for the dictator to advance his dictation to a convenient stopping point before the cassette substitution cycle commences.

The NAND gate 122 is receiving a "one" input from the open switch B-1, as previously mentioned, and is additionally receiving a "one" input along the line 134 from the voluntary substitution circuit 104, irrespective of the position of the selector switch 200 therein. Accordingly, the occurrence of a "zero" input to the NAND gate 122 upon the aforementioned time-out causes the NAND gate 122 to provide a "one" output which, as discussed above, initiates operation of the cassette substitution signal 124 and which also is applied along the line 125, the NAND gate 126, and the NAND gate 105 to control the cassette substitution apparatus 73.

Involuntary substitution of the loaded cassette thus occurs a predetermined time after the remaining-tape sensor 102 signals the occurrence of only a certain amount of tape remaining, without any positive action required on the part of the dictator.

The foregoing involuntary operation of the cassette substitution apparatus will occur in response to the appropriate events as long as a supply of fresh cassettes remains in the cassette carrier. When the cassette carrier is shifted to place the last cassette-carrying position into alignment with the slot 65, however, the cassette carrier actuates the last-cassette switch 103 to place a "one" on the line 135 providing an input to the NAND gate 136. It can be seen from FIG. 9 that the switch B-2 is closed at this time, however, and so a "zero" signal is applied along the input line 137 to the NAND gate 136. A "one" signal thus is maintained on the inhibit line 138 providing to the NAND gate 126 one of the logic conditions necessary for continuation of the cassette substitution cycle. The cassette substitution operation continues in the normal manner, so that this last remaining cassette is operatively engaged with the tape transport mechanism as described above.

When dictation on this last remaining cassette is completed, and either voluntary or involuntary ejection of this cassette occurs, the opening of the switch B-2 which occurs when the cassette is approximately half-way raised to the fully-ejected position shown in FIG. 4 applies a "one" signal on the line 137. The NAND gate 136 now receives "one" inputs along both of lines 135 and 137, and so the output of that NAND gate goes to "zero" and thus removes from the NAND gate 126 one of the "one" inputs necessary to maintain a "zero" condition on the line 127. Since none of the other inputs to the NAND gate 105 is "zero" at this time, the "one" signal previously supplied to the cassette substitution apparatus 73 now disappears. The cassette substitution apparatus thus terminates with the last cassette raised approximately half-way upward into the cassette receptacle.

The "one" signal on the last-cassette switch 103 is also applied along the line 141 to the NAND gate 142. The NAND gate 142 is also receiving "one" inputs along the line 143 from the now-open switch B-2, and along the line 144 from the now-closed switch B-1 as inverted at 145, at this time. The NAND gate 142 thus provides a "zero" along the line 146 as an input to the NAND gate 147. The other input of the NAND gate 147, as applied along the line 148, is a "one" resulting from a "zero" obtained from the reject-auto switch 149 as inverted at 150. The switch 149 is assumed to be in the "auto" position at this time. The NAND gate 147 thus provides a "one" input along the line 151 to the cassette reload signal 152, which may be an indicator lamp or other signal advising that all available cassettes of the present system have been used. The switch B-1 is closed at this point in the substitution cycle, maintaining a "zero" input to the NAND gate 122 and thereby maintaining the operation of the cassette substitution signal 124.

When the used cassettes in the cassette carrier are to be replaced by a fresh supply of cassettes, the operator of the apparatus first places the reject-auto switch 149 in the "reject" position, whereupon a "one" is applied along the line 156 as an input to the NAND gate 157. The switch B-3 remains closed when the ejection of the last cassette was halted by opening of the switch B-2, and the "zero" from the closed switch B-3 is inverted at 158 to provide a "one" to the other input of the NAND gate 157. A "zero" thus appears on the input line 159 to the NAND gate 105, recommencing the operation of the cassette substitution apparatus 73. As soon as the switch B-3 opens, however, it will be seen that the cassette substitution apparatus once again stops; this occurs in the present embodiment of the invention at a time when the last cassette is now fully ejected. The cassette carrier is now manually returned to the starting position and a supply of fresh cassettes substituted for the ejected cassettes. The "one" output from the last-cassette switch 103 disappears, removing the "inhibit" condition from the output line 138 of the NAND gate 136. When the cassette reloading operation has been completed by an operator of the machine, the reject-auto switch is returned to the "auto" position and the "zero" applied along the line 156 to the NAND gate 157, combined with the inverted "one" supplied from the switch B-3, permits the cassette substitution apparatus to perform the cassette-loading portion of the cassette substitution cycle. This cycle is terminated in the usual manner as the switch B-3 becomes closed and the switch B-1 becomes open, when a cassette is operatively engaged by the tape transport mechanism.

It will also be understood that the reject-auto switch 149 can be placed in the "reject" mode at any time when a cassette is loaded in the cassette changer apparatus, causing the apparatus immediately to eject a loaded cassette and to terminate the cassette substitution cycle as soon as that cassette is completely returned to the cassette tray.

With the exception of cassette rejection initiated by the reject-auto switch, the various cassette substitution operations described thus far have occurred either in response to only a predetermined amount of tape remaining on a cassette, or in response to the absence of commanded tape motion, and both of these events are "involuntary" in the sense of not being in response to a deliberate or voluntary act of the dictator commanding substitution of cassettes. Considering the voluntary-substitution circuit 104, however, it will be shown that voluntary substitution of cassettes can occur at the control of the dictator, who is typically remotely situated from the actual cassette changing apparatus 60. The voluntary substitution circuit includes a three-position switch 200 which is selectively positionable at any of the positions 201, 202, and 203. The switch position 201 is connected to maintain a logic "one" state on the line 134 connecting the switch to an input of the NAND gate 122. Each of the switch positions 202 and 203 connected to pulse circuits 204 and 205, respectively, and each of these pulse circuits maintains a "one" signal on the respective switch positions 202 and 203 in the absence of an input to the pulse circuits. The pulse circuit 205 is connected to receive the recorder-busy "one"

signal from the line 37 (FIG. 5), and this steady "one" input to the pulse circuit 205 maintains the aforementioned "one" signal at the switch position 203. The busy signal on the line 37 is inverted at 206 and is supplied to the NAND gate 207. The other input of the NAND gate 207 is the forward-reset signal from the line 38 (FIG. 5) as inverted at 208. The pulse circuit 204 receives a "one" input from the NAND gate 207 when the dictation apparatus is seized, i.e. "busy" and is not in forward-reset operation.

In considering the operation of the voluntary substitution circuit 104, the situation wherein the switch 200 is connected to the switch position 201 has been previously considered, and it can be seen that the presence or absence of a recorder-busy signal cannot affect the cassette substitution apparatus. The voluntary substitution circuit is inoperative in position 201. With the switch 200 moved to contact the switch position 203, the "one" normally maintained at that switch position does not change the cassette substitution operation as described above, so long as the recorder-busy signal remains on the line 37. As soon as the dictator places the hook switch 10a in the on-hook position, indicating that he has completed his dictation, the dictate station 10 loses the previous condition of dictation system seizure and the "one" recorder-busy signal disappears from the line 37. The pulse circuit 205 then operates to place a momentary "zero" pulse on the switch position 203 and thus along the line 134 to an input of the NAND gate 122. It will be recalled that the presence of a "zero" at any input of the NAND gate 122 causes that NAND gate to provide a "one" output which initiates the cassette substitution cycle. Although the momentary "zero" signal from the pulse circuit 205 will disappear before the cassette substitution cycle is completed, the switch B-1 provides a "zero" output to the NAND gate 122 to continue operation of the cassette substitution apparatus for an entire cassette substitution cycle. It can be seen that the act of placing the dictate station in the on-hook condition immediately ejects the previously-loaded cassette and substitutes a fresh cassette, whereas the dictated cassette would have remained loaded in the changer apparatus if the switch position 201 had been selected.

It is a frequent practice for a dictator to rewind part of a cassette after he has finished dictating a message and then to replay part of this message in the forward-listen mode, so that he may review a portion of the just-completed message. The dictator may then place the dictate station in an on-hook condition, having listened to enough of the recorded message to be satisfied with its contents. With the switch 200 moved to the position 203, the cassette would be immediately ejected from the changer apparatus without being wound in the forward direction to the point where the dictated message actually terminates, and this improper positioning of the cassette tape is confusing to the transcriber and may possibly cause the remaining portion of the dictated message to be omitted from transcription and erased. This problem is overcome while maintaining automatic or voluntary cassette substitution, by placing the switch 200 in contact with the position 202. The busy signal present on the line 37 while the recorder is seized is inverted at 206 to provide a "zero" input to the NAND gate 207. The absence of a forward-reset signal on the line 38 is inverted at 208 to provide a "one" input to the NAND gate 207. A "one" input is thus applied to the pulse circuit 204 at this time and is maintained at the switch position 202 during continued seizure of the dictation system. Assuming that a dictated tape is partially rewound by the dictator, as described above, followed by the loss of a recorder-busy signal resulting from an on-hook condition of the dictate station, a "one" signal becomes present on the forward-reset line 38 as described previously. The NAND gate 207 continues to receive a "one" and a "zero" signal at this time, however, and so a "one" is maintained at the switch position 202. When the tape has been fully rewound in the forward-reset condition to a location where the time line terminates, as previously described, a "zero" appears on the forward-reset line and is inverted at 208 to provide a "one" input to the NAND gate 207. This input combines with the "one" corresponding to the inverted absence of a busy signal, and so the pulse circuit 204 now receives a "zero" input. This pulse circuit 204 functions to provide a momentary "zero" to the switch position 202, causing the cassette substitution cycle to be initiated as described previously. Accordingly, it can be seen that automatic voluntary cassette substitution has occurred after the tape on the cassette has been wound to the end of the message previously dictated thereon.

It will be understood that a cassette central dictation system of the type described herein can be provided without the capability of recording any time-line or other control signals. If this is done, the voluntary-substitution circuit 104 can be provided to selectively control cassette substitution whenever the dictate station becomes on-hook.

It will be understood by those skilled in the design and operation of logic-control apparatus and systems that the use of specific logic conditions upon the opening or closing of particular switches, as well as the choice of particular logic devices such as NAND gates responsive to such logic conditions, is a matter of design choice and that other logic states can be provided corresponding to the occurrence or nonoccurrence of events in the implementation of embodiments of the present invention, so long as the operational requirements are satisfied.

Priority Dictation

Users of dictation equipment frequently desire to dictate a letter or other message which will receive priority transcription ahead of previously-dictated messages. The proper handling of dictated messages assigned priority status has been difficult with prior art dictation systems and apparatus, particularly with prior-art central dictation systems of the type which record on an endless loop of tape. If the dictator has already dictated a number of messages on the endless tape and now desires to dictate a message which will receive priority transcription, the transcribing person must pass over the intervening dictated material to reach the priority message contained on the endless tape. After the priority message has been transcribed, the transcriber must then rewind the tape to transcribe the previously-bypassed messages. This procedure is not only time-consuming, but also creates the real possibility that the bypassed nonpriority messages will be inadvertently erased by subsequent message dictation before transcription can occur.

The present invention provides a central dictation system wherein a second central dictation system can be made available to a dictate station on a priority basis at the selection of the dictator. For example, as will become apparent, the system may be designed so that the dictate station is normally interconnected with a conventional endless-loop central dictation system to receive nonpriority messages. In the event of a priority message, however, even though the nonpriority recording apparatus is already seized by the dictate station, a switch can be operated causing the dictate station to release seizure of the nonpriority recording apparatus and to effect seizure of an available priority dictation apparatus. It will be appreciated that a cassette central dictation system as described herein is especially useful as the priority dictation apparatus in such a system, inasmuch as the cassette containing a priority message can be immediately utilized for out-of-turn transcription.

An example of a priority dictation system according to the present invention is shown in FIG. 8, wherein a dictate station 300 having a conventional four-wire audio and control trunk 301 is selectively interconnected by the switch 302 either to a regular central dictation apparatus 303 or to a priority central dictation apparatus 304. The circuitry of the disclosed embodiment is chosen so that the regular dictation apparatus 303, which may typically be a conventional endlessloop dictation-transcription system of the type known to the prior art, is normally connected by the switch 302 to be available for seizure by the dictate station 300. The priority dictation apparatus 304, which may be a cassette dictation system of the type described herein above, is thus connected to the dictate station to be available for seizure in lieu of the regular apparatus 303 only in response to momentary operation of the priority dictation switch 305 associated with the dictate station. The line 306 supplies an operating circuit from the priority dictation apparatus 304 to the coil of the switch 302 and also through the line 307 as a control input to the priority selection circuitry. For the purposes of the herein-disclosed embodiment of the priority dictation system, the line 306 may contain a −24v operating signal supplied by the priority dictation apparatus 304 and considered to be a logic "zero". The line 308 is connected to the seizure or "busy" circuit of the priority dictation apparatus 304; this line 308 maintains a logic "one" if the priority dictation apparatus is available for seizure and a logic "zero" if the priority dictation apparatus is busy or otherwise unavailable for seizure.

The priority selection circuit within the dictate station 300 includes a light-emitting diode (LED) 312, a conventional diode 313, and a resistance 314 all connected in shunt around the priority selection switch 305 and another conventional diode 315. This priority circuit is connected by a pair of lines 316 and 317 to a latch circuit 318 including a pair of NAND gates 319 and 320. A bias of −5v, for example, is applied as at 324 to the line 316, with the diode 325 isolating the gate 326 from the minus voltage present at the latch circuit 318. As will become apparent, the latch circuit 318 maintains a logic "zero" on the line 316 and a logic "one" on the line 317 when the priority selection switch 305 is open-circuit and the switch 302 is in position to place the regular dictation apparatus 303 in communication with the dictate station. However, the aforementioned logic state of the latch circuit 318 becomes reversed upon selection and seizure of the priority dictation apparatus 304 by the dictate station 300.

When the dictate station 300 is placed in an off-hook condition, the regular dictation apparatus 303 is seized in the conventional manner, if such apparatus is available for seizure. The NAND gate 326 is receiving a "zero" along the line 327 from the −5v source at this time, and so a "one" is supplied along the line 328 as an input to the NAND gate 329. The other input of the NAND gate 329 is receiving a "one" from the line 317 at this time, and so a "zero" is applied by the NAND gate 329 to the relay driver 330 to maintain the switch 302 in the de-energized position shown in FIG. 8, whereby the regular dictation apparatus 303 is connected to the dictate station 300.

If it is desired to become connected with the priority dictation apparatus 304 following seizure of the regular dictation apparatus 303, the priority dictation switch 305 is closed to allow the "one" condition present on the line 317 to be applied through the diode 315, the line 316, and the line 327 to the NAND gate 326. If the priority dictation apparatus 304 is available for seizure at this time, the "one" present on the line 308 and the "zero" on the line 307, as inverted at 330, causes the AND gate 331 to provide a "one" along the line 332 to the other input of the NAND gate 326. The output of the NAND gate 326 becomes "zero" at this time, causing the NAND gate 329 to provide a "one" output to the relay driver 330. The switch 302 is energized to connect the priority dictation apparatus 304 to the dictate station 300 in place of the regular dictation apparatus 303.

The "zero" condition on the line 328 is supplied by the line 336 to be inverted at 337 and supplied as a "one" through the diode 338 to provide an input to the NAND gate 339 and also to place a charge on the capacitance 340, which is otherwise maintained at a bias of −5v, for example. As soon as the priority dictation apparatus becomes seized by the dictate station 300 following interconnection by the switch 302, the "one" previously present on the line 308 changes to a "zero" and the output of the AND gate 331 accordingly becomes zero. The zero output of the AND gate 331 is applied to an input of the NAND gate 341 and is inverted at 342 to provide a "one" to the other input of the NAND gate 339. The occurrence of a "zero" along the line 332 causes the "zero" signal on the line 328 to disappear, and thus the "one" output of the invert circuit 337 to disappear. However, the capacitance 340 maintains a "one" input condition to the NAND gate 339 for a sufficient time to enable that gate to present a "zero" input along the line 343 to the NAND gate 319 for the first time. The NAND gate 319 thus presents a "one" signal to the line 316, and this "one" is fed back along the line 344 as an input to the NAND gate 341. The other input to the NAND gate 341 is receiving a "zero" at this time, and so the NAND gate 320 receives inputs causing a "zero" condition to occur on the line 317. It can be seen, accordingly, that priority seizure of the priority dictation apparatus 304 causes the logic state of the latch circuit 318 to become the reverse of the logic state previously maintained on that circuit. The priority seizure-responsive reversal of the latch circuit 318 allows current to flow through the dictate station circuit including the resistance 314, the light-emitting diode 312, and the diode 313, so that the latched seizure of the priority dictation apparatus 304 is signalled by the illumination from the light-emitting diode.

When the priority message dictation is concluded, the dictate station 300 is placed in an on-hook condition to permit loss of seizure of the priority dictation apparatus 304 in the conventional manner. This loss of seizure is signalled by the reappearance of a "one" on the line 308, whereupon the NAND gate 341 receives a "one" signal from the AND gate 331 as well as along the line 344 from the NAND gate 319. The output of the NAND gate 320 once again becomes "one", and this output is fed back along the line 345 to provide an input to the NAND gate 319. The other input of the NAND gate 319 is also "one" at this time, and so a "zero" condition reappears on the line 316. This reversion of the latch circuit 318 to the initial logic state causes the input to the relay driver 330 to become "zero" so that the switch 302 is allowed to reconnect the regular dictation apparatus 303 to the dictate station 300 for subsequent seizure upon the occurrence of an off-hook condition. The priority circuit has become completely reset at this time, as indicated by the absence of illumination from the light-emitting diode 312.

If the priority dictation apparatus 304 is unavailable when the priority dictation switch 305 is closed, the "zero" present on the line 332 prevents priority switching operation of the switch 302. Accordingly, in systems wherein a plurality of dictation stations are available for possible interconnection with the priority dictation apparatus 304, it is impossible for a dictate station to become interconnected with an already-busy priority dictation apparatus.

If the priority dictation switch 305 is closed while the dictate station 300 is on-hook, as might occur inadvertently, the switch 302 is operated in the previously-described manner to connect the dictate station with the priority dictation apparatus 304. The on-hook condition of the dictate station 300 prevents the priority dictation apparatus 304 from becoming seized, however, and so the switch 302 maintains the priority interconnection only as long as the priority dictation switch 305 remains closed. Since the priority dictation switch 305 may be advantageously provided by a momentary-contact switch, the priority dictation apparatus cannot be inadvertently maintained in connection with an on-hook dictate station.

It will be understood, of course, that the foregoing relates only to preferred embodiments of the present invention and that numerous alterations and modifications may be made therein without departing from the spirit and the scope of the invention as set forth in the appended claims.

What is claimed is:

1. A cassette recording apparatus having a plurality of operational modes for causing tape movement in a cassette, wherein the improvement comprises:

a first means for sensing the movement of tape in a first cassette in recording interrelationship with a transducer when said cassette recording apparatus is in a recording mode of operation for causing tape movement;

a second means for substituting a second cassette for said first cassette in response to the detection by said first means of the absence of tape movement in said first cassette when said cassette recording apparatus is in said recording mode of operation for causing tape movement; and signal means responsive to said second means for providing an audible signal corresponding to said second means becoming operative and continuing until the cassette substitution has been terminated.

* * * * *